May 2, 1950 R. C. ZEIDLER 2,505,820
MEANS FOR ASSEMBLING AND RETAINING
RADIALLY DISPOSED VANES
Filed Feb. 28, 1945 3 Sheets-Sheet 1
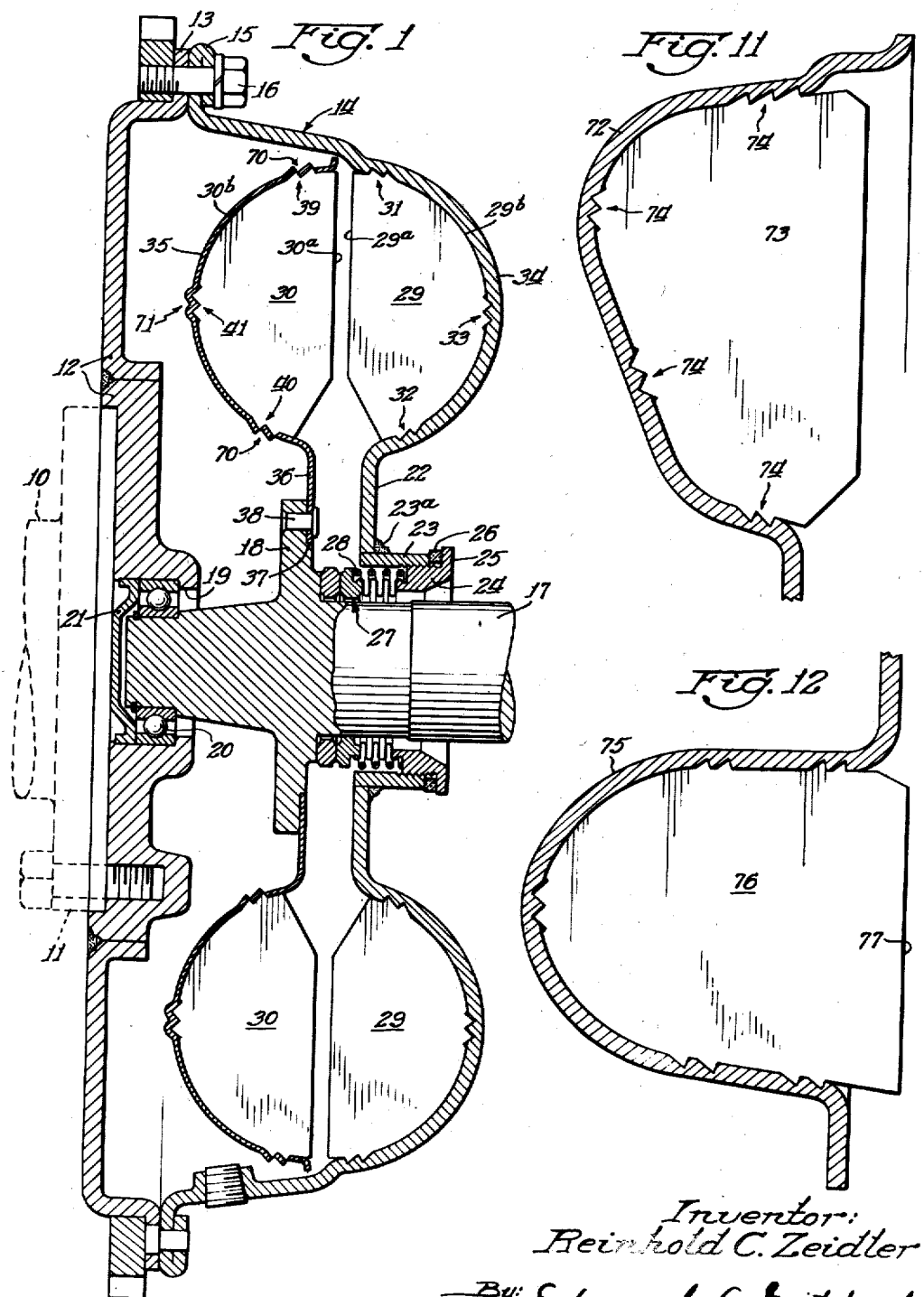
Inventor:
Reinhold C. Zeidler
By: Edward C. Gritzbaugh
Atty.

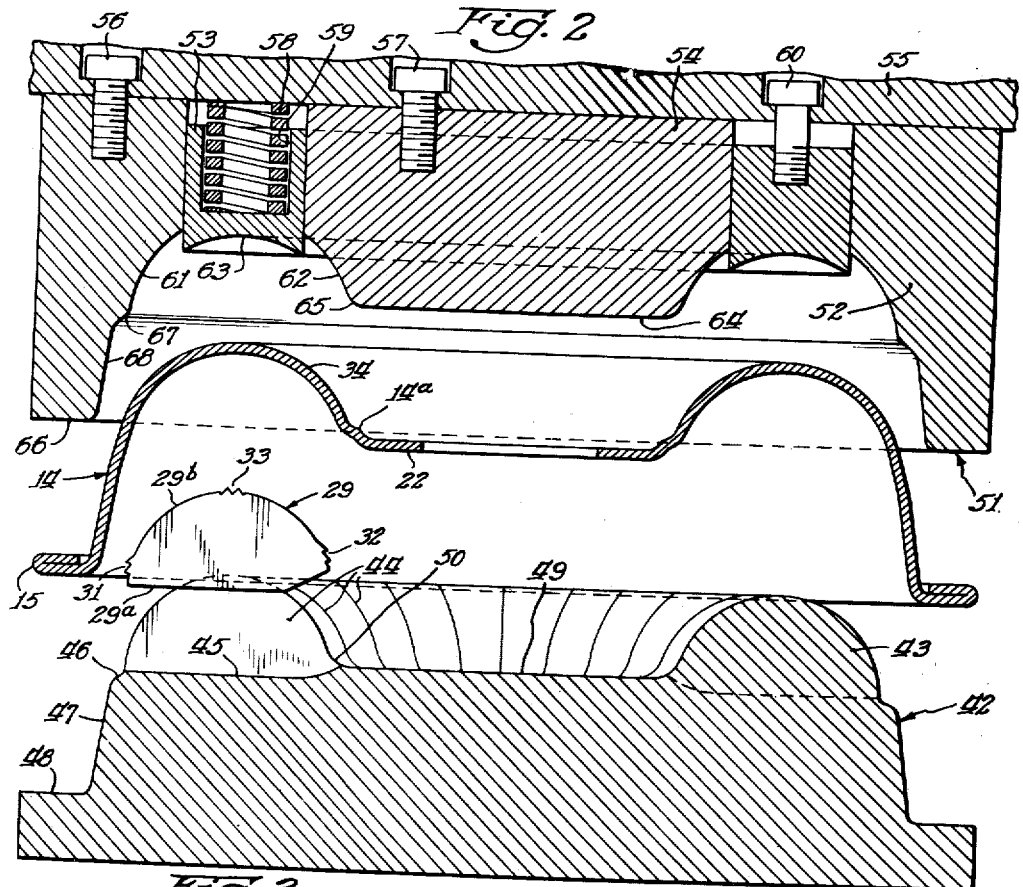
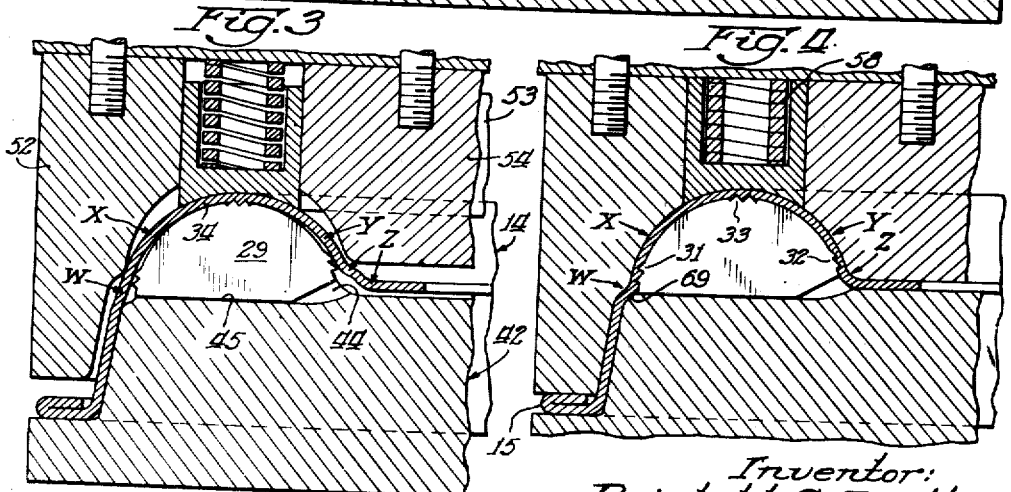

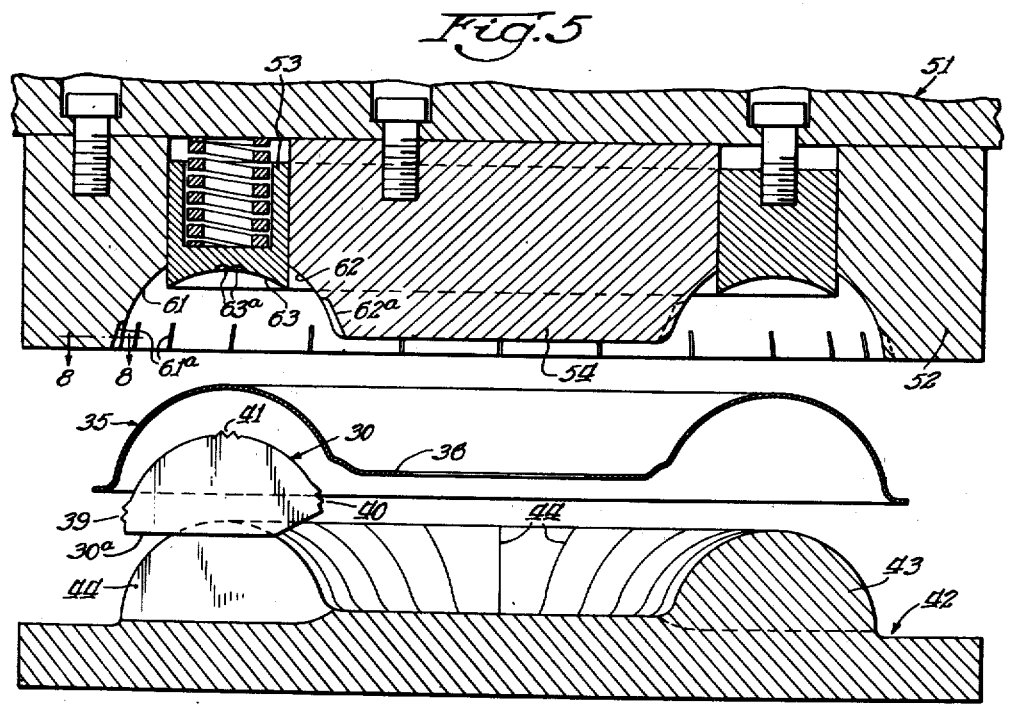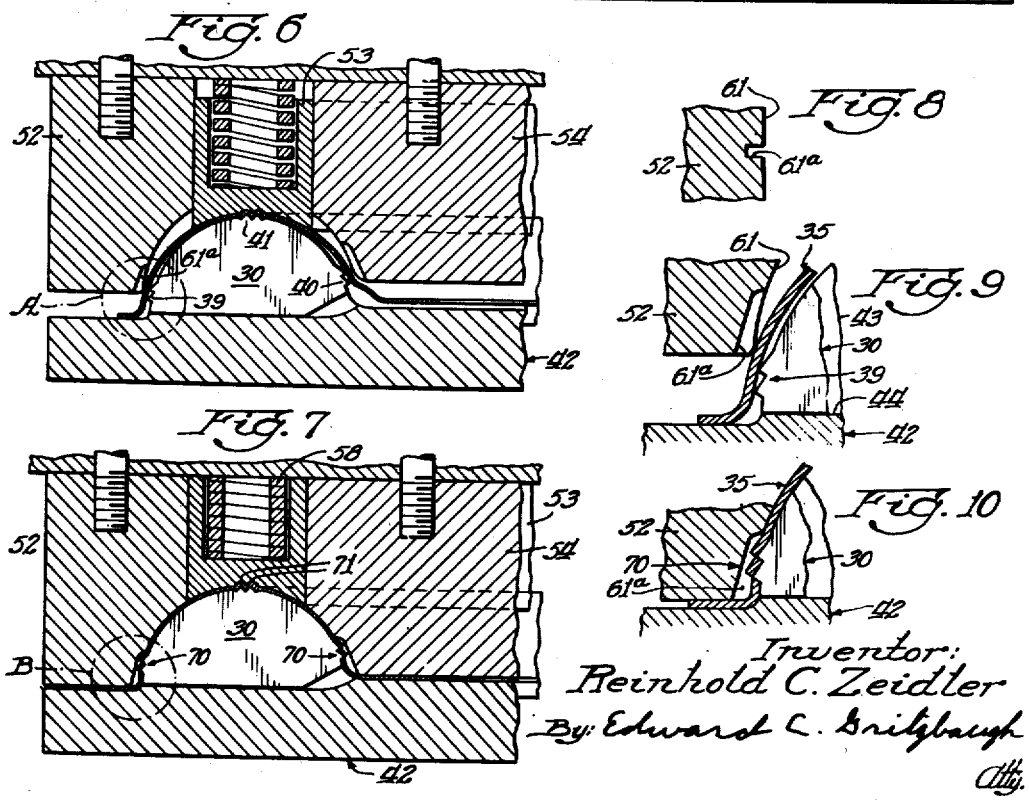

Patented May 2, 1950

2,505,820

UNITED STATES PATENT OFFICE 2,505,820

MEANS FOR ASSEMBLING AND RETAINING RADIALLY DISPOSED VANES

Reinhold C. Zeidler, Detroit, Mich., assignor to Borg-Warner Corporation, Chicago, Ill., a corporation of Illinois Application February 28, 1945, Serial No. 580,237

15 Claims. (Cl. 103—115)

The present invention relates to means for assembling and retaining vanes in a rotatable supporting member. More specifically the present improvements relate to the mounting of radially disposed vanes in the housings or shells which comprise the driving and driven members of fluid couplings or hydraulic torque transmission devices that are especially adapted for use in motor vehicles of the fluid or hydraulic drive type.

While the improvements are herein disclosed in a fluid coupling such as above mentioned, the instrumentalities for practicing this invention are applicable for use in a variety of types of mechanisms and therefore are not limited to the particular use herein explained.

In prior vaned hydraulic coupling devices the vanes have been assembled with their supporting members, such as a shell or housing, by a variety of means, and most of these arrangements have required expensive equipment and have consumed considerable time and labor to mount or fix the vanes in place. Also it has been the practice to mount or fix the vanes separately by successive welding operations, or by clinching over tabs on the vanes that are seated in recesses or slots in the housing or shell members. It is apparent that the expense incident to these prior arrangements frequently represents a considerable proportion of the total cost of fabricating the device. By employing the present arrangement all of the vanes are preferably simultaneously mounted or fixed to a housing or shell by a single operation, thus reducing the time as well as the expense of assembling the parts of the driving and driven members of a hydraulic torque transmitting device or fluid coupling.

It is one of the principal objects of this invention to simplify the construction and arrangement of a device such as contemplated herein, and to improve the manner of assembling the respective parts thereof.

Another principal object hereof is to provide an arrangement whereby the components of a vaned member may be quickly and effectively assembled by a single operation.

Still another principal object hereof resides in providing an arrangement in a fluid coupling and the like wherein the vanes are of a relatively hard material and the housings or shells are of relatively soft material. The vanes have a plurality of teeth or projections extending beyond their normal boundaries that are caused to pierce or enter into the adjacent walls of the housing or shell that is pressed against the edges of the vanes during the assembling operation. This causes the teeth or projections to bite into the material of the housing or shell to fix the vanes in place. In the present arrangement the walls of the housing or shell are preformed to approximately the finished shape, and during the assembling operation these walls are distorted at certain regions, preferably at or alongside the vane teeth, to effect a positive interlocking of the vanes and housing or shell walls.

A further object of the invention is to eliminate unnecessary parts in a hydraulic torque transmitting device or fluid coupling by mounting and fixing one set of vanes directly on the driving member of said coupling, thus making it unnecessary to employ the intermediate shell member commonly used for the driving member vanes.

A still further object hereof is to improve the efficiency of performance of the fluid coupling by streamlining the passages through which the fluid flows. The manner in which the vanes are retained in the housing or shell eliminates the commonly used tabs, lugs, rivets and the like which interfere with the fluid circuit and cause turbulence therein.

Additional objects, aims and advantages of the invention contemplated herein will be apparent to persons skilled in the art after the construction and operation of the present hydraulic torque transmitting device or fluid coupling is understood from the within description. It is preferred to accomplish the numerous objects of this invention and to practice the same in substantially the manner hereinafter fully described and as more particularly pointed out in the appended claims.

Reference is now made to the accompanying drawings that form a part of this specification, wherein:

Fig. 1 is an axial section of a hydraulic torque transmitting device or fluid coupling showing the instrumentalities of the present invention incorporated therein;

Fig. 2 is an axial sectional view showing a preferred form of equipment for fixing a plurality of vanes in the driving member or housing of a fluid coupling, the opposing die members, the housing stamping, and the vanes in separated positions preparatory to the assembling operation;

Fig. 3 is a fragmentary axial section showing the die members partly closed;

Fig. 4 is a view similar to Fig. 3, showing the die members completely closed at the end of the assembling operation;

Fig. 5 is an axial section similar to Fig. 2 showing the application of the present arrangement for effecting the assembly of the vanes in the driven shell member of a fluid coupling, said shell member being of thinner material than the material of the housing member shown in Fig. 2;

Fig. 6 is a fragmentary axial section showing the die members of Fig. 5 in partly closed position;

Fig. 7 is a view similar to Fig. 6, showing the die members completely closed at the end of the assembling operation;

Fig. 8 is an enlarged fragmentary section along the plane of line 8—8 on Fig. 5;

Fig. 9 is an enlarged view of the region enclosed in the broken line circle A on Fig. 6;

Fig. 10 is an enlarged view of the region enclosed in the broken line circle B on Fig. 7; and Figs. 11 and 12 are enlarged sectional views showing the principles of the present invention applied to vanes and housings or shells having different shapes than those in the preceding figures.

The drawings are to be understood as being more or less of a schematic character for the purpose of disclosing a typical or preferred form of the improvements which are contemplated herein, and in these drawings like reference characters identify the same parts in the different views.

Referring now to a detailed description of the improved fluid coupling shown in Fig. 1 of the drawings, 10 is a crank or drive shaft to the end of which there is bolted the disk-like flange 11 of which there is bolted the disk-like composite casting 12 which provides one of the walls of the fluid housing and has an annular L-shaped flange 13 at its margin. A suitable metal stamping 14 with a folded back radial marginal flange 15 is secured by bolts 16 to housing flange 13 to form a fluid-tight housing for the hydraulic torque transmitting device or fluid coupling. The stamping 14 provides the other wall of the housing and, together with the disk-like wall 12, defines a container of substantially toroidal shape as shown in Fig. 1.

The driven shaft 17 extends into the housing comprised of walls 12 and 14 and supports a hub member 18 preferably in the form of a radial flange. The inner end of driven shaft 17 projects into a central opening 19 in housing wall 12 where said shaft is supported by an anti-friction bearing 20. A suitably shaped seal cap 21 is securely anchored in the outer portion of opening 19 where it may be firmly engaged by the adjacent face of driving disk 11 whereby to prevent leakage past the bearing.

Stamping 14 has a radially inward central portion 22 surrounding the opening through which driven shaft 17 enters the housing, and there is a tubular hub 23 welded as at 24 to the inner edge of said central portion 22 as seen in Fig. 1. Hub 23 is internally threaded to receive an externally threaded hollow sleeve nut 24 which has a flange 25 that compresses a packing washer 26 against the end edge of hub member 23. The inner end of sleeve nut 24 serves as an abutment for a bellows type seal 27 which is inserted between said nut 24 and the hub flange 18, against the latter of which the seal is yieldably urged by a helical spring 28.

It will be observed that the vanes 29 and 30 of the two respective members of the coupling are substantially duplicates, each comprising a semi-circular plate or stamping arranged so that the plane or straight edges 29a and 30a are proximate each other in the driving and driven members and with the arcuate or segmental edges 29b and 30b outwardly disposed in the housing as shown in Fig. 1.

The driving vanes 29 have a plurality of serrations, teeth, or projections that extend beyond the normal boundaries of these vanes on their curved or segmental edges, and these teeth members may be arranged in a plurality of groups. As shown herein, there is a radially outward group 31, a radially inward group 32, and an intermediate group 33. The metal of the stamping 14 comprising a wall of the driving member is softer or more ductile than the material from which vanes 29 are formed, and there is an intermediate outward bulge or torus region 34 of concavo-convex cross section that conforms with the contour of the segmental or curved edges 29b of the adjacent vanes. In assembling the vanes 29 in the housing torus region 34, the preformed housing and the vanes are pressed together with the edges of the vanes exerting pressure transversely of the housing. This causes the teeth or the like on the vanes to pierce or bite into the wall of the housing thus fixing the vanes firmly in place.

It will be here explained that various materials may be used for the driving housing and its vanes although it has been found that steel is the cheapest and most easily fabricated. Satisfactory results have been attained by making the vanes of a high carbon steel which is given a simple heat treatment to produce a hardness of about Rockwell C 45, and the housing member is made of deep drawing low carbon steel having a hardness of about Rockwell B 65. Converting these materials into a common hardness they would be respectively about Brinell 421, and about Brinell 112. Thus it will be seen, the vanes are almost four times harder than the housing member. This data is given merely by way of a comparative example and in no sense limits the material used in the fabrication of the vanes and the housing member.

The driven member vanes 30 are carried by a stamped shell 35 of concavo-convex cross section having a central portion 36 extending radially inward to the hub flange 18 where it is seated on a shouldered portion 37 of said hub flange and secured in place by rivets 38 or the like.

This shell 35 of the driven member is preferably a preformed stamping of metal thinner than the housing 14 of the driving member. The driven vanes 30 have groups of serrations, teeth or projections 39, 40 and 41 at their respective radially outward portions, radially inward portions, and their intermediate portions. The assembling or fixing of these vanes in the shell 35 is performed in approximately the same manner as hereinbefore explained with reference to the driving member of the coupling, with the exception that the outward and inward groups of teeth or the like are preferably sheared through the shell 35 as shown in Fig. 1. The shell 35 is of a softer steel than the steel used for fabricating the vanes 30 and bears the same relationship thereto as has been explained with respect to the driving member of the coupling.

The housing 14 and the shell 35 are assembled with their proper vanes 29 and 30 by means of the apparatus and in the manner shown in Figs. 2 to 4 and Figs. 5 to 10 respectively, the two apparatus being generally similar to each other, but differ only in certain minor details for the purpose of adapting them to the specific structures of the housing 14 and shell 30.

The assembly which is employed for fixing the vanes 28 in housing 14 is best shown in Figs. 2, 3 and 4. This assembly comprises an arrangement whereby the vanes are supported in proper radial array equidistantly spaced from each other so that by a relative movement between the vanes and the housing the teeth on the vanes are forced to enter the walls of the housing to fix or lock the vanes in place. The housing 14 is preformed to approximately its finished shape, the vanes 28 are completely finished with the teeth or serrations 31, 32 and 33 projecting beyond their arcuate edges 29b as previously described.

The punch member 42 of the die assembly is shaped to give the desired final form or contour to the housing. To do this, the member 42 has an annular or ring-like ridge or bulge 43 of semicircular cross section which has radially disposed outwardly diverging slits 44 for receiving and holding a complete set of vanes 28. The widths of slits 44 are sufficient to effect a minimum of clearance between their sides and the proximate faces of the vanes, and their inner ends 45 are approximately straight so that the straight edges 29a of the vanes will rest or bottom thereon. The outer or work surface of the ridge in cross section conforms with the segmental edges 29b of the vanes when they are seated in said slits 44 so that only the teeth or serrations 31, 32 and 33 project beyond the surface of the ridge.

At the outer periphery of the ridge 43, the punch member 42 has a chamfered shoulder 46 and below this shoulder the punch member has a frusto-conical annular region 47 that terminates in an annular base 48 that is flat in a radial plane. The contour of this portion of the die punch member conforms with the final cross-sectional shape of the corresponding radially outer portion of the housing 14 after the vane teeth have been set by entering them into the wall of the housing. Also there is a flat region or land 49 on the central portion of punch member 42 that joins with or merges into the radially inward base surface of the ridge 43. At this juncture the punch member is concavely curved as at 50 the purpose of which will be later explained.

The die member 51 which opposes the punch member 42 is preferably a composite assembly comprising a plurality of annular sections 52, 53 and 54 respectively, disposed in concentric array and mounted on a back plate or shoe 55. The outer and inner sections 52 and 54 are sufficiently spaced from each other to movably accommodate the annular intermediate section 53 between them, and they are secured to back plate or shoe 55 by dowel pins (not shown) and by bolts 56 and 57 respectively. The intermediate annular section 53, which constitutes the pressure pad, is free to move axially with respect to the rest of this die assembly, and it is backed by a plurality of heavy pressure springs 58 seated in pockets 59 in the ring pressure pad and bearing against the back plate or shoe 55. The springs 58 are maintained in a preloaded condition by bolts 60 so as to limit the amount ring pressure pad 53 projects beyond the adjacent concave shaped contour forming surfaces 61 and 62 of the respective outer and inner sections 52 and 54 of this die member assembly 51. As seen in Figs. 2 to 4, the work face of the ring pressure pad 53 is formed with a concave channel 63 which is a counterpart of the crown portion of the housing toroid region 34 with which it will engage when the opposed shaping members 42 and 51 are moved toward each other.

The inner section 54 of die assembly 51 has a central flat region 64 to oppose the central flat region 49 of the punch member 42 with the apertured central portion 22 of housing 14 between them. The work corner 65 of this inner die section is rounded on a radius smaller than the radius of the previously mentioned juncture 50 which it opposes on punch member 42 for engaging a suitable preformed bead 14a on the housing stamping. The rounded corner 65 is adapted to engage the adjacent portion of housing 14 to force the teeth or serrations 32 on the vanes into the opposing portion of the housing and deforms the bead 14a during relative movement between the opposing die members. Thus said bead is deformed by forcing it into the corner 50 of the punch member during the final travel of the relatively movable members 42 and 51 of the apparatus. This continuously progressive relative movement is graphically shown in Figs. 3 and 4.

The angular outer die section 52 has a flat radial region 66 to oppose the flat radial base 48 of the punch member 42 with the preformed folded back flange 15 of the housing between them. At the outer margin of the concave contour forming surface 61 on die section 52, there is a rounded shoulder 67 and beyond this shoulder there is an outward diverging smooth work surface 68 that is a counterpart of frusto-conical region 47 on the punch member 42. The function of shoulder 67 is to press the vane teeth or serrations 31 into the housing wall and to deform this wall back of said teeth by shaping an ogee bend 69 in the wall as shown in Fig. 3 and 4. This deforming takes place during the final period of continuous travel of the relatively movable members 42 and 51 of the apparatus.

It will be understood that when the vane fixing operation begins the pad ring 53 will contact the crown portion of the housing stamping thus causing the vane teeth 33 to enter and bite into the housing wall. During this portion of the operation the springs 58 are of sufficient strength to hold the ring 53 without being compressed. As the relative movement progresses, the ring 53 becomes retracted, thus compressing the springs until the ring bottoms on back plate or shoe 55. In this fully retracted position the concave work face 63 of the ring will be in exact registration with the adjacent edges of the concave surfaces 61 and 62 so that the outer and inner die sections and the concave face 63 of the pad ring provide a continuous substantially semi-circular arc conforming with the toroidal shape of the housing stamping. The preformed shape of the housing 14 is such that it conforms with and freely fits the punch member at the surfaces 47 and 48.

It is important to here note the relationship of the shape of the housing to the dies at the locations marked with arrows W, X, Y and Z in Figs. 3 and 4. It is at these points that the dies impart the final form to the housing by distorting it to cause the vane teeth 31 and 32 to engage and bite into the housing, with said distortion causing the material in the housing to take a permanent set, thus preventing any "spring back" of the material which might leave the vanes loosely mounted in the housing when the dies are opened.

It will be seen that the operation of fixing the vanes in the housing comprises placing the vanes in annular array in the seats or slots 44 which are arranged radially in the ridge 43 of punch member 42. When the vanes are thus arranged, only the teeth or serrations 31, 32 and 36 of said vanes project beyond the surface of the ridge, so that when the preformed stamped housing 14 is superimposed thereon the annular toroidal portion 34 of the housing will properly position the vanes by shifting or sliding them longitudinally in their seats. Relative movement between the opposing die members bring the pressure ring 53 into initial contact with the housing as seen in Fig. 3 causing an axial or parallel movement of the entire housing 14 during which teeth 33 are entered and the housing bottoms on the adjacent surface of the punch member ridge 43 on both sides of teeth 33. As the relative movement continues, pressure ring 53 retracts, the dies continue to close, and the housing stamping 14 as a whole ceases to move axially but a movement or deforming of material takes place principally radially inward at the teeth 31 and 32 to enter them into the housing as seen in Fig. 4. Also there is a deforming of material at the arrows W and Z which forces the material inward alongside or back of teeth 31 and 32. The housing material is relatively thick to give it necessary strength as the drive member of a fluid coupling to resist operating forces due to centrifugal force and internal liquid pressure. This thickness of the material is sufficient to permit the vane teeth to enter into it to lock the vanes in fixed positions and also to effect a driving connection but not pass through or puncture the housing so as to cause leakage of the fluid.

Figs. 5 to 10 show the assembly or apparatus adapted for fixing the vanes 39 in place in the shell 35 of the driven member of a fluid coupling. The construction and operation of such apparatus is approximately the same as hereinbefore described with respect to the driving member of the fluid coupling. The shell 35 in this instance is of much thinner material than housing 14 since it is not subjected to the heavy operating forces as those to which the housing is subjected. The shell material although thin is also relatively softer than the vanes 30 that are fixed therein by the action of opposing die members. Furthermore, the driven shell vanes 30 may correspond identically with driving housing vanes 29 so as to be interchangeable therewith and said driven vanes may numerically exceed the driving member vanes for the purpose of bringing about certain operating characteristics of a hydraulic torque transmitting device. Since the driven shell 35, as seen in Fig. 1, is entirely within the toroidal container (comprised of housing 14 and back wall casting 12) and it is surrounded by or immersed in the working fluid which exerts approximately the same pressure on both sides of the walls of shell 35, leakage of fluid from one side through the shell to the other side thereof is not necessarily harmful. Consequently it is practical, and has been found desirable to permit the driven vane teeth 39 and 40 to be sheared through the wall of shell 35 as at 70 in Figs. 1 and 7. This necessitates modifying the die construction to the extent that radial notches 61 and 62a are made in the concave work surfaces 61 and 62 of inner and outer annular die sections 54 and 52, such notches being of equal number to and directly in line with the vane positioning slots or seats 44 in the ridge 43 of the punch member 42. Also side-by-side indentations 63a are made in the deepest portion of the concave work face 63 of the retractable ring member 53 of die assembly 51, which results in the formation of small outwardly projected bosses 71 on the finished assembly. The purpose of notches 61a and 62a, and indentations 63a, is twofold; first, they give the material in the driven shell 35 somewhere to go so as to prevent direct compression which might cause undue wear of the die and possible rupture or distortion of the vane teeth; and second, since the width of the notches and the diameters of the indentations are only slightly more than the thickness of the vane it causes the teeth to shear through the shell or be enveloped by the shell leaving the edge of the normal shell wall in tight driving contact with the sides of the vane teeth.

For the purpose of simplicity, as well as convenience in identifying parts of the die assemblies shown in Figs. 5 to 10 which correspond with identical parts of the assemblies shown in Figs. 2, 3 and 4, said parts have been given identical reference characters. Also it should be understood that the operation of fixing the vanes 30 in the driven shell 35 is performed in a single operation and by the same method as that performed in fixing the vanes 29 in the driving housing, the only exception being that teeth 39 and 40 of driven shell vanes 30 are sheared through the shell stamping.

The steps of producing the hydraulic torque transmission device, fluid coupling, or other assembly, involve the preforming of the member on which the preformed toothed vanes are to be fixed. This member is a stamping preferably having a channel cross section and may comprise a torus. The toothed vanes are inserted into slots in one of the die elements, which, in the event the finished article is to be employed as a fluid coupling member, will position the vanes in radial array. The preformed vane supporting member, which preferably is channeled, is then seated upon the vanes in contact with the vane teeth thereby effecting a proper positioning of the vanes to center them. The thus-assembled parts are engaged with an opposing or second die member by causing a relative movement between the dies. This movement of the dies will press the vane supporting member or torus around the toothed vanes which deforms said member or torus into the desired shape and the teeth of the vanes are thus forced or pierced into the surface material of the member or torus, thereby to maintain the vanes against dislodgment and preventing any spring back of the material when the dies are opened. The method of fixing the vanes in their supporting member is not limited to the fabrication of a torus member for a hydraulic torque transmission device or fluid coupling since it is apparent the same arrangement and steps may be readily employed for anchoring vanes on a suitable supporting member or carrier element.

In the foregoing specification, and in the subjoined claims, the tapered outwardly projecting teeth or serrations on the vanes are described as piercing the walls of the housing and the shell. This does not necessarily mean that the teeth actually puncture or perforate the material with which they are engaged but that said teeth merely enter or bite into the material. Also it is apparent that the material of the shell or housing may be merely deformed or shaped around proximate portions of the teeth during the operation of the dies so that the teeth become firmly imbedded in the material to effect anchorage of the vanes.

The shell or housing 72 shown in Fig. 11 is a torus of asymmetric contour in cross section and the margin of the vane 73 is a counterpart thereof with groups of saw-like teeth 74 pierced into the shell or housing. The shell or housing 75 and the vane 76 in Fig. 12 are elongated in a direction away from the straight edge 77 of the vane. In both instances the several groups of teeth are pierced into the metal wall of the housing.

While this invention has been described in detail in its present preferred form or embodiment, it will be apparent to persons skilled in the art, after understanding the improvements, that various changes and modifications may be made therein without departing from the spirit or scope thereof. It is therefore aimed in the appended claims to cover all such changes and modifications.

I claim:

1. A vane comprising a plate of generally semi-circular contour, the arcuate margin of said plate adapted to fit a concave counterpart face on a vane supporting member, and teeth projecting beyond the arcuate margin, said teeth having straight radial edges and edges sloping therefrom, said teeth being adapted to pierce said counterpart concave face of the supporting member and displace the material thereof.

2. A vane comprising a plate having at least one arcuate margin, and teeth projecting beyond said arcuate margin, said teeth having straight radial edges and sloping edges whereby said teeth are adapted to pierce into and displace material of a concavely channeled member in which said vane plate is received and supported.

3. A vaned member comprising a vane receiving body having a concave wall surface, and a plurality of vanes in radial array on said wall, the margins of said vanes having projections that are engaged with and pressed into said wall thereby to effect the sole anchorage means for said vanes.

4. A vaned member comprising an annular body having a wall of concavo-convex cross-section, and a plurality of vanes in radial array on the concave face of said wall, the margins of said vanes having spaced groups of projections pressed into said concave wall, and the wall being deformed outwardly back of certain of said groups of projections, whereby said deformation and the adjacent projections provide the sole means for securing said vanes in said concave wall.

5. A vaned member for a hydraulic torque transmission and the like, comprising a torus-like annular body of concavo-convex cross-section, and a plurality of vanes in radial array on the concave face of said body, said vanes having margins which are counterparts of said concave surface, and projections on said counterpart vane margins pressed into and effecting a deformation of said wall, whereby said projections and deformations provide the sole means for anchoring said vanes.

6. A vaned member for a hydraulic torque transmission and the like, comprising an annular torus-like member embodying a stamping of concavo-convex cross-section, and a plurality of vanes in radial array in said member, each vane embodying a stamping having an arcuate margin fitting the concave surface of said annular member stamping, and projections on said arcuate margin of the vane stamping which projections are pressed into the concave portion of said annular member stamping and deforming material thereof, whereby each vane is positively anchored in said member.

7. A vaned member for a hydraulic torque transmission and the like comprising a metal stamping constituting a rotatable torus-like annular member having a vane receiving inner face of concave cross-section; a plurality of metal stampings constituting vanes with arcuate margins having contours conforming with the concave inner face of said annular member, said vanes arranged in radial array with respect to the axis of said annular member; and projections on the arcuate margins of said vanes, said projections having radial and sloping edges pierced into the concave inner face of said annular member, the construction and arrangement of said projections being such that the radial edges thereof present axial movement of said vanes relative to said torus-like annular member.

8. A vaned member for fluid couplings and the like comprising, a hollow toroidal wall having a concave surface; and a plurality of radial segmental vanes arranged in spaced annular array within said wall, said vanes having arcuate edges and a plurality of spurs projecting from said edges, said arcuate edges being assembled within said hollow wall to fit the concave surface thereof, and said spurs being bodily pierced into the concave surface of said hollow wall and entered at least partly through the thickness of said wall.

9. A vaned member for fluid couplings and the like comprising, an open-sided housing defined by a hollow toroidal wall of pre-formed concavo-convex cross section defining an open-sided housing; and a plurality of radial segmental vanes arranged in spaced annular array within said housing, said vanes each being pre-formed with arcuate edges arranged to fit the concave face of said housing; and a plurality of spurs projecting from said vane edges and having straight radial edges and sloping edges, said spurs being pierced through the concave surface of said toroidal housing wall and entered at least partly through the thickness of said wall, the construction and arrangement of said spurs being such that the radial edges thereof are adapted to prevent axial movement of said vanes relative to said housing.

10. A device of the class described comprising a torus-like vane receiving member of concavo-convex cross-section, and a vane therefor, said vane having marginal teeth pierced into and displacing material of said member in a direction away from said teeth, the arrangement providing the sole means for maintaining said member and vane in assembly.

11. A vane comprising a plate adapted to fit into a torus-shaped vane receiving member of concavo-convex cross-section, said plate having marginal teeth on at least three spaced positions adapted to engage said vane receiving member, and bite into said vane receiving member whereby the material thereof is displaced away from said teeth, the arrangement providing the sole means for maintaining said member and vane in assembly with said torus-shaped vane receiving member.

12. A vaned member for a hydraulic torque transmission and the like, comprising an annular torus-like member embodying a stamping of concavo-convex cross-section, and a plurality of vanes in radial array in said member, each vane embodying a stamping having an arcuate margin fitting the concave surface of said annular member stamping, projections on said arcuate margin of the vane stamping which projections are pressed into the concave portion of said annular member stamping and deforming material thereof, whereby each vane is positively anchored in said member, wherein the projections on the vanes comprise a plurality of outwardly converging pointed teeth having radial and sloping edges which pierce the concave face of the annular member.

13. A vaned member for a hydraulic torque transmission and the like, comprising an annular torus-like member embodying a stamping of concavo-convex cross-section, and a plurality of vanes in radial array in said member, each vane embodying a stamping having an arcuate margin fitting the concave surface of said annular member stamping, projections on said arcuate margin of the vane stamping which projections are pressed into the concave portion of said annular member stamping and deforming material thereof, whereby each vane is positively anchored in said member, a vane receiving member, and a vane therefor, said member and said vane comprising metal stampings, said vane having outwardly tapered marginal projections with radial and sloping edges which are pierced into said member.

14. A vaned member for a hydraulic torque transmission and the like, comprising an annular torus-like member embodying a stamping of concavo-convex cross-section, and a plurality of vanes in radial array in said member, each vane embodying a stamping having an arcuate margin fitting the concave surface of said annular member stamping, projections on said arcuate margin of the vane stamping which projections are pressed into the concave portion of said annular member stamping and deforming material thereof, whereby each vane is positively anchored in said member, a vane receiving member, and a vane therefor, said member and said vane comprising metal stampings, said vane having marginal projections with radial and sloping edges pierced into said member, the metal of said member being thereby deformed around said projections with the projections pierced therein.

15. The method of fixing a plurality of segmental shaped vanes having spaced groups of axially and radially pointing teeth or spurs in the smooth concave surface of a semi-toroidal housing, comprising: arranging the vanes in spaced radial array in a radially slotted annular first die member having a cross-section conforming generally with the contour of a vane, and with the spurs protruding therefrom; superimposing and centering the toroidal housing in a semi-formed state on the protruding spurs; initially engaging the housing with a second die member to effect permanent outward radial distortion at the smooth inner portion of said housing and permanent inward radial distortion at the outer portion of said housing to effect an approximate counterpart of the finished housing; and then continuing the engagement of the housing with said second die by further relative axial movement to cause the spurs pointing in an axial direction to pierce into said housing, and the spurs pointing radially inward and outward to pierce into said portion of housing which has been permanently distorted in radial directions, the distorting the housing and the piercing the vane spurs therein comprising the sole means for permanently fastening the vanes in said housing.

REINHOLD C. ZEIDLER.

REFERENCES CITED

The following references are of record in the file of this patent:

UNITED STATES PATENTS

| Number | Name | Date |
|---|---|---|
| 903,454 | Dake | Nov. 10, 1908 |
| 1,470,505 | Steenstrup | Oct. 9, 1923 |
| 1,720,754 | Baumann | July 16, 1929 |
| 1,868,146 | Klep | July 19, 1932 |
| 1,916,175 | Lysholm et al. | June 27, 1933 |
| 1,988,595 | Hiss | Jan. 22, 1935 |